(12) United States Patent
Kim et al.

(10) Patent No.: US 11,526,687 B2
(45) Date of Patent: Dec. 13, 2022

(54) APPARATUS FOR GENERATING LEARNING DATA FOR COMBUSTION OPTIMIZATION AND METHOD THEREFOR

(71) Applicant: DOOSAN ENERBILITY CO., LTD, Changwon-si (KR)

(72) Inventors: Hyun Sik Kim, Gimpo-si (KR); Sang Gun Na, Yongin-si (KR); Jee Hun Park, Gwangmyeong-si (KR)

(73) Assignee: DOOSAN ENERBILITYTY CO., LTD., Changwon (KR)

( * ) Notice: Subject to any disclaimer, the term of this patent is extended or adjusted under 35 U.S.C. 154(b) by 692 days.

(21) Appl. No.: 16/572,874

(22) Filed: Sep. 17, 2019

(65) Prior Publication Data

US 2020/0167592 A1 May 28, 2020

(30) Foreign Application Priority Data

Nov. 26, 2018 (KR) .................. 10-2018-0147791

(51) Int. Cl.
*G06K 9/62* (2022.01)
*G06N 3/04* (2006.01)
(Continued)

(52) U.S. Cl.
CPC .......... *G06K 9/623* (2013.01); *G06F 16/285* (2019.01); *G06K 9/6223* (2013.01);
(Continued)

(58) Field of Classification Search
CPC .... G06K 9/623; G06K 9/6223; G06K 9/6262; G06F 16/285; G06N 3/0454; G06N 3/084
See application file for complete search history.

(56) References Cited

U.S. PATENT DOCUMENTS 5,740,033 A 4/1998 Wassick et al.
7,010,461 B2 * 3/2006 Draxton ............. G01N 33/0062
702/182
(Continued)

FOREIGN PATENT DOCUMENTS

DE 102007061604 A1 6/2009
JP 2009-110256 A 5/2009
(Continued)

*Primary Examiner* — Michael R Neff
(74) *Attorney, Agent, or Firm* — Harvest IP Law LLP (57) ABSTRACT

An apparatus and method for generating learning data for combustion optimization is provided. The apparatus includes a data pre-processor to collect raw data including currently measured real-time data for boiler combustion and previously measured past data for the boiler combustion, and to perform pre-processing for the collected raw data, and a data analyzer to derive learning data from the raw data by analyzing the raw data. An apparatus for combustion optimization includes a management layer to collect currently measured real-time data for boiler combustion, to determine whether to perform combustion optimization, and to determine whether to tune a combustion model and a combustion controller; a data layer to derive learning data from raw data; a model layer to generate the combustion model/controller through the learning data; and an optimal layer to calculate a target value for combustion optimization and to output a control signal according to the calculated target value.

17 Claims, 8 Drawing Sheets

(51) Int. Cl.
*G06F 16/28* (2019.01)
*G06N 3/08* (2006.01)

(52) U.S. Cl.
CPC ......... *G06K 9/6262* (2013.01); *G06N 3/0454* (2013.01); *G06N 3/084* (2013.01)

(56) References Cited

U.S. PATENT DOCUMENTS

| | | | |
|---|---|---|---|
| 10,007,944 B2 | 6/2018 | Johnson et al. | |
| 2008/0071501 A1* | 3/2008 | Herzog | G05B 23/0254 |
| | | | 702/185 |
| 2017/0236032 A1 | 8/2017 | Lin et al. | |
| 2017/0316438 A1* | 11/2017 | Konig | G06Q 30/016 |
| 2019/0065960 A1* | 2/2019 | Taylor | G06N 3/008 |
| 2019/0094843 A1* | 3/2019 | Lee | G06N 5/04 |
| 2020/0166206 A1* | 5/2020 | Park | F22B 35/18 |

FOREIGN PATENT DOCUMENTS

| | | |
|---|---|---|
| JP | 2018128995 A | 8/2018 |
| KR | 1019980051203 A | 9/1998 |
| KR | 10-2017-0125265 A | 11/2017 |
| KR | 10-1810968 B1 | 12/2017 |

\* cited by examiner

APPARATUS FOR GENERATING LEARNING DATA FOR COMBUSTION OPTIMIZATION AND METHOD THEREFOR

CROSS-REFERENCE TO RELATED APPLICATION

This application claims priority to Korean Patent Application No. 10-2018-0147791, filed on Nov. 26, 2018, the disclosure of which is incorporated by reference herein in its entirety.

BACKGROUND

Field

Apparatuses and methods consistent with exemplary embodiments relate to a learning data generation technology, and more particularly, to an apparatus for generating learning data necessary for combustion optimization and a method therefor.

Description of the Related Art

A boiler of a coal-fired power plant heats water by using the exothermic reaction that occurs during coal combustion and produces the steam required for power generation. In doing so, contaminated exhaust gas such as nitrogen oxide is generated. When the amount of generated contaminants is great, costs for managing the treatment of the exhaust gas increases, and in case of incomplete combustion, combustion efficiency reduces and the power generation/operation cost increases. Accordingly, it is necessary to develop a technique for reducing the exhaust gas while increasing the combustion efficiency. For this purpose, combustion optimization is performed, and there is an inconvenience that the user should process data through a plurality of operations in generating data necessary for learning for combustion optimization. Further, there is a difficulty in generating the data unless the user is a skilled user.

SUMMARY

Aspects of one or more exemplary embodiments provide an apparatus for generating learning data necessary for combustion optimization and a method therefor.

Additional aspects will be set forth in part in the description which follows and, in part, will become apparent from the description, or may be learned by practice of the exemplary embodiments.

According to an aspect of an exemplary embodiment, there is provided an apparatus for generating learning data. The apparatus may include a data pre-processor configured to collect raw data comprising currently measured real-time data for boiler combustion and previously measured past data for the boiler combustion, and to perform pre-processing for the collected raw data; and a data analyzer configured to derive learning data from the raw data by analyzing the raw data.

The data pre-processor may include a restorer configured to restore a portion with an abnormal signal in the raw data; a filter configured to filter the raw data according to a predetermined condition through a base knowledge algorithm; and an eraser configured to erase outliers in the raw data.

The data analyzer may include a cluster configured to cluster the raw data by deriving correlation between the tags necessary for learning by analyzing the correlation between the tags of the raw data; and a sampler configured to extract the learning data from the raw data clustered according to the correlation between the tags. Here, the sampler may include a pattern analyzer configured to derive the pattern of the raw data by analyzing the raw data based on the L2 Norm; and a data sampler configured to derive the learning data by sampling the raw data based on the derived pattern and a sampling algorithm.

The raw data may include input data and output data corresponding to the input data.

The learning data may include input data for learning a neural network (NN) model and target data corresponding to the input data.

According to an aspect of another exemplary embodiment, there is provided an apparatus for generating learning data. The apparatus may include a management layer configured to collect currently measured real-time data for boiler combustion, to determine whether to perform combustion optimization by analyzing the collected real-time data, and to determine whether to tune a combustion model and a combustion controller; a data layer configured to derive learning data from raw data comprising the real-time data and previously measured past data for the boiler combustion; a model layer configured to generate the combustion model and the combustion controller through the learning data; and an optimal layer configured to calculate a target value for combustion optimization by using the combustion model and the combustion controller, and to output a control signal according to the calculated target value.

The data layer may include a data pre-processor configured to collect the raw data comprising the currently measured real-time data for boiler combustion and the previously measured past data for the boiler combustion, and to perform pre-processing for the collected raw data; and a data analyzer configured to derive learning data from the raw data by analyzing the raw data. Here, the data pre-processor may include a restorer configured to restore a portion with an abnormal signal in the raw data; a filter configured to filter the raw data according to a predetermined condition through a base knowledge algorithm; and an eraser configured to erase outliers in the raw data. Further, the data analyzer may include a cluster configured to cluster the raw data by deriving correlation between the tags necessary for learning by analyzing the correlation between the tags of the raw data; and a sampler configured to extract the learning data from the raw data clustered according to the correlation between the tags.

The sampler may include a pattern analyzer configured to derive the pattern of the raw data by analyzing the raw data based on the L2 Norm; and a data sampler configured to derive the learning data by sampling the raw data based on the derived pattern and a sampling algorithm.

The raw data may be accumulated over the time collected and classified for each tag. Further, the learning data may include input data for learning a neural network (NN) model and target data corresponding to the input data.

According to another of the present disclosure, there is provided a method for generating learning data. The method may include steps of collecting, by a data pre-processor, raw data comprising currently measured real-time data for boiler combustion, and previously measured past data for the boiler combustion; performing, by the data pre-processor, pre-processing for the collected raw data; and deriving, by a data analyzer, learning data from the raw data by analyzing the raw data. Here, the performing the pre-processing may include steps of restoring, by a restorer of the data pre-processor, a portion with an abnormal signal in the raw data; filtering, by a filter of the data pre-processor, the raw data according to a predetermined condition through a base knowledge algorithm; and erasing, by an eraser of the data pre-processor, outliers in the raw data. Further, the deriving the learning data may include steps of clustering, by a cluster of the data analyzer, the raw data by deriving correlation between the tags necessary for learning by analyzing the correlation between the tags of the raw data; and extracting, by a sampler of the data analyzer, the learning data from the raw data clustered according to the correlation between the tags.

The extracting by the sampler of the data analyzer may include steps of deriving, by a pattern analyzer of the sampler, the pattern of the raw data by analyzing the raw data based on the L2 Norm; and extracting, by a data sampler of the sampler, the learning data by sampling the raw data based on the derived pattern and a sampling algorithm.

As described above, according to one or more exemplary embodiments, it is possible to provide by generating the learning data necessary for combustion optimization, thereby enhancing convenience, and providing high-performance optimization result when performing the combustion optimization by using the corresponding learning data.

BRIEF DESCRIPTION OF THE DRAWINGS

The above and other aspects will become more apparent from the following description of the exemplary embodiments with reference to the accompanying drawings, in which.

DETAILED DESCRIPTION

Hereinafter, various modifications and various embodiments will be described in detail with reference to the accompanying drawings so that those skilled in the art may easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein. In order to clearly illustrate the disclosure in the drawings, some of the elements that are not essential to the complete understanding of the disclosure may be omitted, and like reference numerals refer to like elements throughout the specification.

The terminology used in the disclosure is for the purpose of describing specific embodiments only and is not intended to limit the scope of the disclosure. The singular expressions "a," "an," and "the" are intended to include the plural expressions as well unless the context clearly indicates otherwise. In the disclosure, terms such as "comprises," "includes," or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

First, a configuration of an apparatus for combustion optimization according to an exemplary embodiment will be described with reference to FIG. 1.

Figure 1:
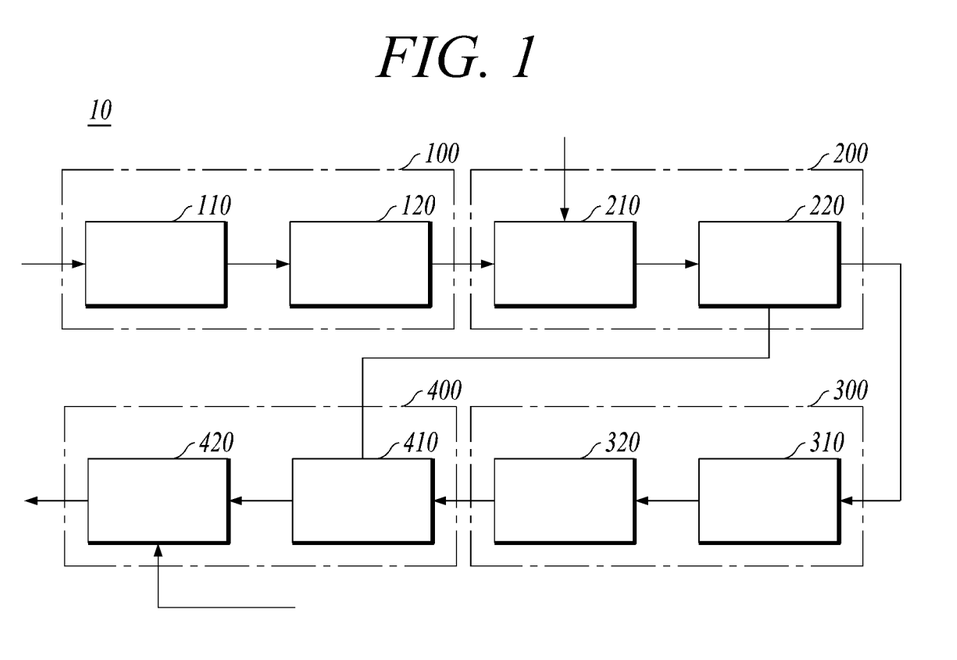
FIG. 1 is a block diagram of an apparatus for combustion optimization according to an exemplary embodiment.

Referring to FIG. 1, a combustion optimization apparatus 10 according to an exemplary embodiment includes a management layer 100, a data layer 200, a model layer 300, and an optimal layer 400.

The management layer 100 is configured to manage combustion optimization, a combustion model, and a combustion controller by collecting the currently measured real-time data for boiler combustion, and analyzing the collected real-time data. That is, the management layer 100 manages whether to perform the combustion optimization and whether to tune the combustion model and the combustion controller by analyzing the measured data. For this purpose, the management layer 100 includes a combustion manager 110 and an auto-tuning manager (model/controller) 120 for the combustion model and the combustion controller.

The combustion manager 110 is configured to manage combustion optimization. A boiler system includes a boiler (not shown) and a combustion controller (not shown) for controlling the combustion of the boiler. The combustion manager 110 determines whether to perform the combustion optimization based on real-time data, which is data measured in real time from the boiler system. Here, the real-time data includes the operation data and the state binary value of the boiler. The operation data includes a sensed value, as measured through a plurality of sensors with respect to the boiler, and a control value for controlling the boiler. The state binary value is a flag value indicating whether a change in the state of a parameter related to the boiler is outside a predetermined range. More specifically, the state binary value is data indicating, as a binary value, the degree of change in status. Such a change may include a variation of the output of the boiler, a variation of the fuel amount used, a variation of the fuel supply amount, a variation of the water supply amount, a variation of the combustion air supply amount, a variation of the coal supply amount, whether to operate a soot blower, and whether to implement boiler protection logic. Considering for example the boiler parameter being the combustion air supply amount, as long as an amount of combustion air supply fluctuates within a predetermined range from its current value, the state binary value of the combustion air supply amount is maintained as a binary "0." In this case, the state binary value changes to a binary "1" only when the fluctuation goes beyond the predetermined range.

The auto-tuning manager (model/controller) 120 is configured to manage the combustion model and the combustion controller. The auto-tuning manager 120 determines whether to tune the combustion model and the combustion controller based on the real-time data measured in real time and whether to perform the combustion optimization. Here, a combustion model design algorithm 310 and a combustion controller design algorithm 320, which will be described below, are implemented (operated) only when the auto-tuning manager 120 determines to perform tuning. The algorithms do not operate when the auto-tuning manager 120 determines not to perform tuning.

The data layer 200 is configured to pre-process and sort data in order to generate learning data necessary for the design of the combustion model and the combustion controller. That is, the data layer 200 extracts the learning data necessary for the design of the combustion model and the combustion controller from the currently measured real-time data for the boiler combustion, and the past data previously measured and stored for the boiler combustion. The data layer 200 includes a data pre-processor 210 and a data analyzer 220.

The data pre-processor 210 pre-processes data including real-time data and past data. Here, the data pre-processor 210 performs at least one pre-processing operation among signal restoration, filtering, and outlier processing. Here, the signal restoration restores missing data; the filtering filters data suitable for the condition, based on base knowledge or data; and the outlier processing erases data that exceeds the upper limit value or falls below the lower limit value. This pre-processing may remove noise that is present in the tag data or is present in data that may adversely affect designing or tuning the combustion model and the combustion controller.

The model layer 300 is configured to generate the combustion model and the combustion controller based on the learning data. For this purpose, the model layer 300 includes the combustion model design algorithm 310 and the combustion controller design algorithm 320.

The combustion model design algorithm 310 designs the combustion model, which is a key factor in optimizing the boiler combustion. The combustion model design algorithm 310 generates the combustion model based on the learning data. That is, the combustion model design algorithm 310 constitutes the combustion model for outputting predictive data predicting factors such as the power generation output, the combustion state including the temperature of the steam and the exhaust gas, the composition of the exhaust gas (carbon monoxide, nitrogen oxide), and the residual oxygen amount after the combustion, which are important variables for combustion based on the input data including the real-time data and the past data such as fuel input amount, air input amount, water input amount, and air temperature.

The combustion model according to an exemplary embodiment is generated based on at least one of a plurality of parametric models including a transfer function model and a state space model and a plurality of nonparametric models. Table 1 below shows an example of the parametric model and the non-parametric model according to an exemplary embodiment.

TABLE 1

| Parametric Model | Transfer Function | Equation Error | Auto-Regressive eXogeneous (ARX) |
| --- | --- | --- | --- |
| | | | Nonlinear Auto-Regressive eXogeneous (NARX) |
| | | | Finite Impulse Response (FIR) |
| | | | Auto-Regressive Moving Average eXogenious (ARMAX): Pseudolinear Regression Model |
| | | | Auto-Regressive (AR) |
| | | | Auto-Regressive Moving Average (ARMA) |
| | | | Auto-Regressive Auto-Regressive eXogeneous (ARARX): Generalized Least-Squares Model |
| | | | Auto-Regressive Auto-Regressive Moving Average eXogeneous (ARARMAX): Extended Matrix Model |
| | | Output Error | Output Error (OE) |
| | | | Box and Jenkins (BJ) |
| | State Space | | Linear Time Invariant (LTI), Linear Time Variant (LTV) |
| | | | Linear Model, Nonlinear Model |
| | | | Continuous Time, Discrete Time, Delay Time |
| | | | Single Input Single Output (SISO), |
| | | | Multi Input Multi Output (MIMO) |
| | | | Stochastic Model, Deterministic Model |
| | | | Robust, Open Loop, Closed Loop |
| Non Parametric Model | Non Parametric (Data Set Type) | | |
| | Impulse Response | | |
| | Step Response | | |
| | Frequency Transfer Function | | |
| | Tree | | |
| | Neural Network (NN): FF, FB, Radial Basis Function, Convolutional, Spiking, Deep NN (Deep Belief Network), Recurrent NN | | |

The data analyzer 220 derives learning data by analyzing the pre-processed data. The data analyzer 220 analyzes the correlation between the data based on the tag of the data, then clusters the data, and selects the input data whose correlation degree reaches a predetermined value for model output data through the correlation analysis for the design of the combustion model. Accordingly, the input data and target data corresponding to the input data may both be derived. Further, the data analyzer 220 performs sampling for sorting the data in the steady state necessary for the design of the combustion model and the combustion controller through a pattern analysis of the data.

Further, the combustion model may be derived by using at least one of the optimization algorithms listed in Table 2 below.

TABLE 1

| Parametric Model | Prediction Error Method (PEM) |
| --- | --- |
| | Maximum Likelihood Method (MLM) |
| | Least-Squares Method (LSM) |
| | Batch Least-Squares Method |
| | Off-line Least-Squares Method |
| | Extended Least-Squares Method (ELSM) |
| | Generalized Least-Squares Method (GLSM) |
| | Recursive Least-Squares Method (RLS) |

TABLE 1-continued

| | |
|---|---|
| | Instrumental Variable Method (IVM)<br>Principle Component Analysis (PCA)<br>Dynamic Principle Component Analysis (DPCA)<br>Partial Least Squares (PLS)<br>SubSpace-based State Space Model<br>Identification (4SID) Method<br>(+Singular Value Decomposition (SVD))<br>(+QR Decomposition)<br>N4SID Method<br>Multivariable Output Error State sPace (MOESP)<br>Method<br>Canonical VariateAnalysis (CVA)<br>Singular Value Decomposition<br>Minimal Realization Method (MRM) |
| Non<br>Parametric<br>Model | Transient Response Method<br>Correlation Analysis<br>Frequency Response Method<br>Spectral Analysis Method<br>Empirical Transfer Function Estimate (ETFE) Method<br>Single/multi-layer perceptron learning, Back-propagation,<br>Gradient descent LayerwisePretraining: Auto-Encoder,<br>BolzmannMachine |

The combustion controller design algorithm 320 designs the combustion controller, which is a key factor in optimizing the boiler combustion based on the learning data. While the combustion model is used to generate the optimal target value for optimal combustion control, the designed combustion controller plays a role in its generation. That is, the combustion controller derives the predictive data through the combustion model, the predictive data being derived based on the input data (input to the combustion model?) including the real-time data and the past data. The combustion controller then derives the optimal target value with reference to the derived predictive data.

The optimal layer 400 is configured to select the optimal combustion model and combustion controller and to calculate the optimal target value for combustion optimization by using the selected combustion model and combustion controller. For this purpose, the optimal layer 400 includes an optimal model/controller selector 410 and a combustion optimization algorithm 420.

The optimal model/controller selector 410 is used to select the most optimal combustion model and combustion controller among several combustion models and combustion controllers that have been previously produced based on the analysis results of real-time data.

The optimal model/controller selector 410 analyzes the real-time data and the past data. Here, the analysis includes 1) base knowledge-based data analysis and 2) data-based analysis. As a result of the data analysis, information on a pattern of real-time data, a change in power generation output, an efficiency condition, and a driving condition may be derived. The optimal model/controller selector 410 selects an optimal combustion model to be used for the combustion control based on the information derived according to the result of the data analysis described above. Further, the optimal model/controller selector 410 selects an optimal combustion controller for the combustion optimization by using the result of the data analysis and the combustion model.

The combustion optimization algorithm 420 calculates the optimal target value for the combustion optimization by inputting the real-time data to the combustion model and controller selected by the optimal model/controller selector 410. Thereafter, an optimal control target value or an auxiliary value associated with the optimal control target value is calculated by using the set points and the manual bias in the current DCS.

Next, a method for optimizing combustion according to an exemplary embodiment will be described with reference to FIG. 2.

Figure 2:
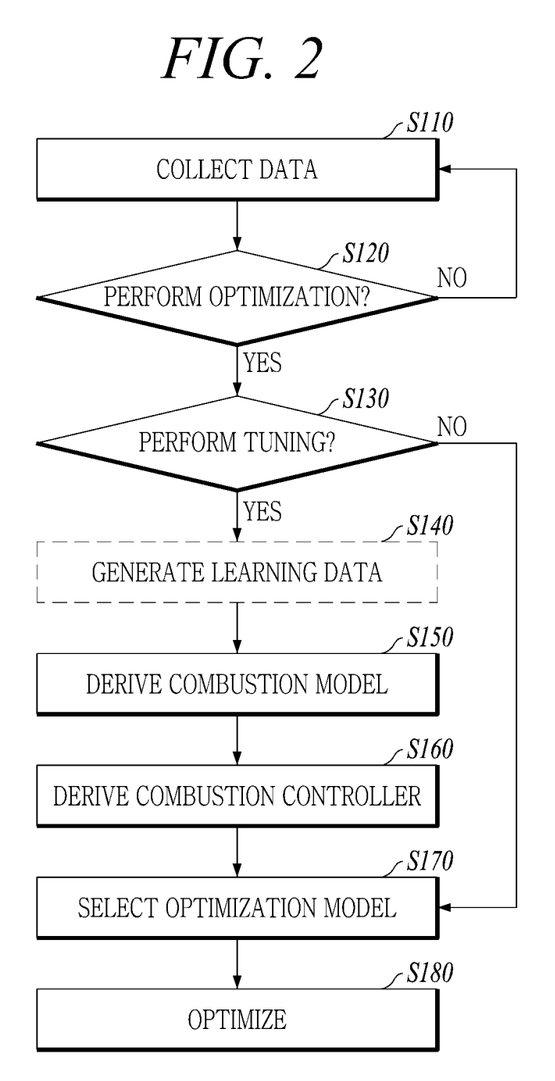
FIG. 2 is a flowchart of a method for optimizing combustion according to an exemplary embodiment.

Referring to FIG. 2, the combustion manager 110 of the management layer 100 collects currently measured real-time data for the boiler combustion of a power plant (operation S110). This real-time data includes the operation data and the state binary value of the boiler.

The operation data includes a sensed value, as measured through a plurality of sensors with respect to the boiler, and a control value for controlling the boiler. The state binary value is a flag value indicating whether a change in the state of a parameter related to the boiler is outside a predetermined range. More specifically, the state binary value is data indicating, as a binary value, the degree of change in status. Such a change may include a variation of the output of the boiler, a variation of the fuel amount used, a variation of the fuel supply amount, a variation of the water supply amount, a variation of the combustion air supply amount, a variation of the coal supply amount, whether to operate a soot blower, and whether to implement boiler protection logic. Considering for example the boiler parameter being the combustion air supply amount, as long as an amount of combustion air supply fluctuates within a predetermined range from its current value, the state binary value of the combustion air supply amount is maintained as a binary "0." In this case, the state binary value changes to a binary "1" only when the fluctuation goes beyond the predetermined range.

The combustion manager 110 determines whether to perform the optimization according to a predetermined condition based on the collected data (operation S120). More specifically, the combustion manager 110 may determine whether to perform the optimization through the operation data-based analysis, the state binary value-based analysis, and the analysis reflecting the knowledge and experience of the expert. For example, according to the analysis reflecting the knowledge and experience of the expert, it is possible to determine whether to perform the optimization according to whether the range of specific operation data such as NOx, CO, and Unit Load Demand and the value according to the influence between the data are normal. Particularly, the combustion manager 110 may derive whether the optimization control of the boiler is applicable and whether the combustion optimization may be performed, and may determine to perform the optimization when two values are true.

As the determination result (operation S120), if it is determined to perform the optimization, the auto-tuning manager 120 of the management layer 100 determines whether to tune the combustion model and the combustion controller based on at least one of the real-time data, whether to perform the combustion optimization, and whether to perform learning for the tuning of the combustion model and the combustion controller (operation S130).

First, if it is determined to perform the tuning, the data layer 200 generates the learning data necessary for the design of the combustion model and the combustion controller by pre-processing and sorting the currently measured real-time data and the past data previously measured (operation S140). The data pre-processor 210 of the data layer 200 firstly performs the pre-processing for the currently measured real-time data and the previously measured past data (operation S140). At this time, the data pre-processor 210 may perform a pre-processing operation of at least one of signal restoration for restoring missing data, filtering for filtering the data satisfying a predetermined condition based on base knowledge or data, and outlier processing for erasing the data exceeding the upper limit value or falling below the lower limit value. Accordingly, the data, etc. that may adversely affect in removing the noise in the tag data or designing the combustion model and the combustion controller are erased in advance. Further, the data analyzer 220 of the data layer 200 performs the sampling of sorting only the important data of the steady state necessary for designing the combustion model and the combustion controller through the pattern analysis of the data, and selects input variables whose correlation degree reaches a predetermined value for the output variables of the combustion model and the combustion controller through the correlation analysis, etc. for designing the combustion model (operation S140). That is, the data analyzer 220 generates the learning data through the sampling and the input variable selection.

Next, the combustion model design algorithm 310 of the model layer 300 generates the combustion model based on the learning data (operation S150). The combustion model according to an exemplary embodiment may be generated based on at least one of the parametric model including the transfer function model and the state space model and the nonparametric model as in Table 1. The combustion model design algorithm 310 may derive the combustion model by using at least one of the optimization algorithms as in Table 2 by applying the learning data to at least one of the parametric model and the nonparametric model as in Table 1. This combustion model is configured to predict factors such as the power generation output, the combustion state including the temperature of the steam and the exhaust gas, the composition of the exhaust gas (carbon monoxide, nitrogen oxide), and the residual oxygen amount after the combustion, which are important variables for combustion, based on the input such as fuel input amount, air input amount, water input amount, and air temperature.

Next, the combustion controller design algorithm 320 of the model layer 300 derives the combustion controller based on the learning data (operation S160). The designed combustion controller will play a role in producing the target value for the optimal combustion control. The combustion model is used to produce the optimal target value.

Next, the optimal model/controller selector 410 of the optimal layer 400 selects the optimum combustion model and combustion controller among the plurality of combustion models and combustion controllers previously generated based on the analysis result of the currently measured real-time data (operation S170).

The optimal model/controller selector 410 firstly selects the combustion model by analyzing the real-time data (operation S170). Here, the optimal model/controller selector 410 selects the combustion model having the smallest residual, for example, the difference between the currently measured real-time data for the boiler combustion and the estimation data estimated through the combustion model among the plurality of combustion models. Thereafter, the optimal model/controller selector 410 selects the combustion controller based on the selected combustion model.

Further, the combustion optimization algorithm 420 of the optimal layer 400 calculates the optimal target value for the combustion optimization by inputting the currently measured real-time data to the previously selected combustion model and combustion controller (operation S180). At this time, the combustion optimization algorithm 420 may calculate the control target value and the auxiliary value associated therewith.

Hereinafter, a configuration of an apparatus for generating learning data for combustion optimization according to an exemplary embodiment will be described in more detail with respect to FIGS. 3-5.

Figure 3:
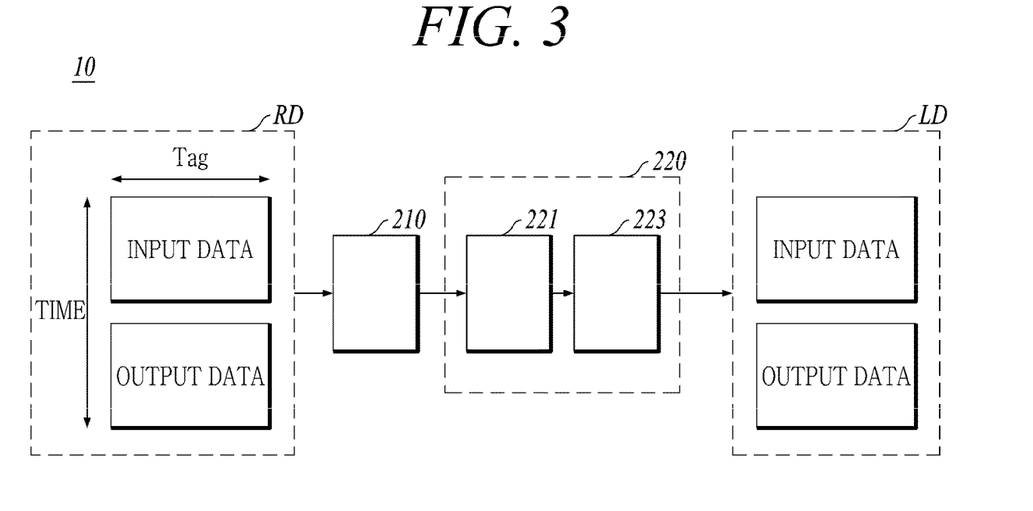
FIG. 3 is a block diagram of an apparatus for generating learning data for combustion optimization according to an exemplary embodiment.
Figure 4:
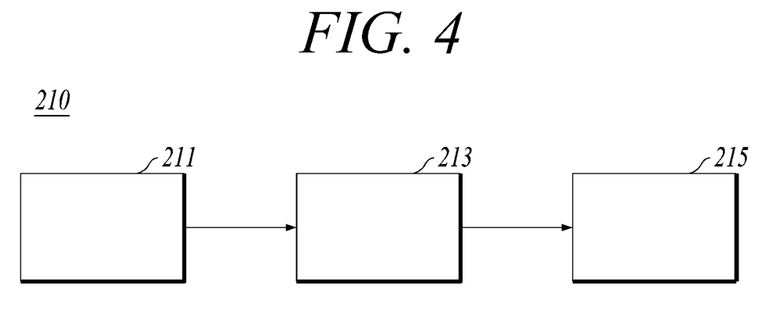
FIG. 4 is a block diagram a data pre-processor of the apparatus of FIG. 3.

First, referring to FIG. 3, the data layer 200 according to an exemplary embodiment collects raw data (RD) and derives learning data (LD) by processing the collected raw data.

The raw data (RD) includes the currently measured real-time data for the boiler combustion and the previously measured past data for the boiler combustion. The raw data (RD) has the input values for the system and the output values corresponding to the input values that are accumulated over time and then classified and collected for each tag. Here, the tag indicates the type or the attribute of the data. Further, the learning data (LD) is derived as an input value for learning a neural network (NN) model and a target value corresponding to the input value. Thus, an input value and a target value are paired with each other. The input value is a value input to the neural network (NN) during learning, and the target value is a value for comparing the input value with the output value of the neural network (NN) during learning.

The data layer 200 includes the data pre-processor 210 and the data analyzer 220, and the data analyzer 220 includes a cluster 221 and a sampler 223.

The data pre-processor 210 is configured to perform pre-processing for the raw data (RD). Referring to FIG. 4, the data pre-processor 210 includes a restorer 211, a filter 213, and an eraser 215.

The restorer 211 restores a portion with an abnormal signal in the data.

The filter 213 filters data according to a predetermined condition through a base knowledge algorithm. For example, it is possible to store the corresponding data by satisfying a predetermined condition by observing a change in the ULD input value for a predetermined time. As another example, when the numerical values of the ULD input value, NOx, CO, etc. satisfy the predetermined condition, the corresponding data may be stored, the unsatisfactory data may be deleted, or the value may be changed. Further, in the case of abnormal data, the data may be removed.

The eraser 215 is configured to erase outliers. That is, the eraser 215 sets the upper limit and lower limit values of the data for each tag, and erases the data that exceeds the upper limit value or falls below the lower limit value.

The cluster 221 is configured to cluster the data necessary for learning by analyzing the correlation between the tags, and remove the unnecessary tag. Since this clustering removes unnecessary tag information, and clusters data based on relevant tag information, it is possible to generate more efficient learning data.

The cluster 221 groups the tags whose correlation equals a predetermined value or greater for each tag based on the correlation information by analyzing the correlation between the tags of the data, and after grouping the tags having a similar pattern, maps the tag corresponding to the input value and the tag corresponding to the output value that corresponds to the input value.

Figure 5:
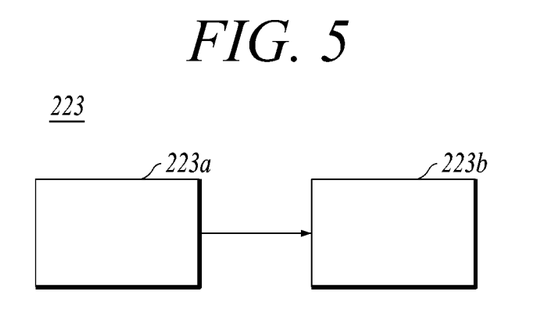
FIG. 5 is a block diagram of a sampler of the apparatus of FIG. 3.

Referring to FIG. 5, the sampler 223 is configured to derive the learning data by sampling the data grouped for each tag. At this time, the sampler 223 generates the learning data of the neural network (NN) model based on pattern analysis and a sampling algorithm. For this purpose, the sampler 223 includes a pattern analyzer 223a and a data sampler 223b.

The pattern analyzer 223a derives a pattern of data by analyzing data based on the L2 Norm. Thereafter, the data sampler 223b generates the learning data (LD) by sampling the data through the sampling algorithm based on the derived pattern. This learning data (LD) is derived as the input value for learning the neural network (NN) model and the target value corresponding to the input value.

Next, a method for generating learning data for combustion optimization according to an exemplary embodiment will be described with reference to FIGS. 6-8.

Figure 6:
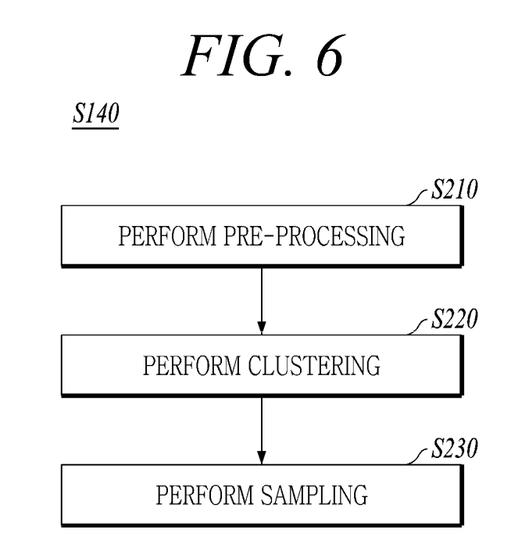
FIG. 6 is a flowchart of the operation to generate learning data of FIG. 2.

First, referring to FIG. 6 detailing the operation S140 of FIG. 2, the data pre-processor 210 pre-processes the raw data (RD) (operation S210). Here, the raw data (RD) includes the currently measured real-time data for the boiler combustion and the previously measured past data for the boiler combustion. The raw data (RD) has the input values for the system and the output values corresponding to the input values accumulated over time and classified and collected for each tag. Here, the tag indicates the type or the attribute of the data. The operation S210 will be described in more detail with reference to FIG. 7 as follows.

Figure 7:
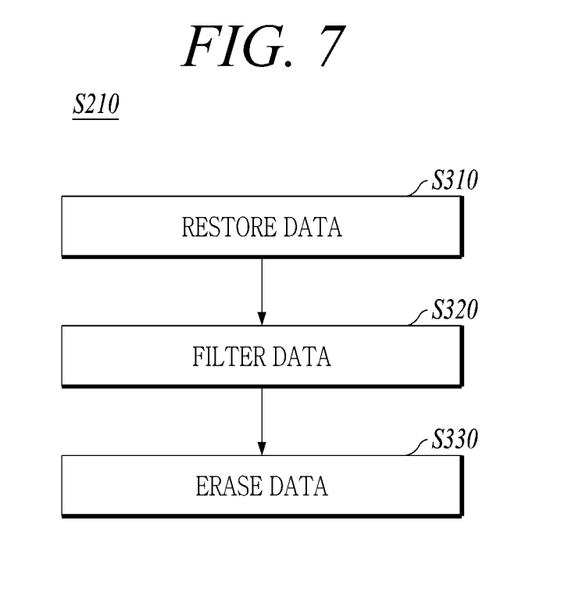
FIG. 7 is a flowchart of the operation to perform pre-processing of FIG. 6.

Referring to FIG. 7, the restorer 211 restores a portion with an abnormal signal in the data (operation S310).

Further in operation S210, the filter 213 filters data according to a predetermined condition through the base knowledge algorithm (operation S320). For example, it is possible to store the corresponding data by satisfying the predetermined condition by observing the change in the ULD input value for a predetermined time. As another example, when the numerical values of the ULD input value, NOx, CO, etc. satisfy the predetermined condition, the corresponding data may be stored, the unsatisfactory data may be deleted, or the value may be changed. Further, in the case of abnormal data, the data may be removed.

Further in operation S210, the eraser 215 erases the outlier (operation S330). At this time, the eraser 215 sets the upper limit and lower limit values of the data for each tag, and erases the data that exceeds the upper limit value or falls below the lower limit value.

Referring back to FIG. 6, the cluster 221 clusters the data necessary for learning by analyzing the correlation between the tags, and removes unnecessary tags (operation S220). Since this clustering removes unnecessary tag information, and clusters data based on the relevant tag information, it is possible to generate more efficient learning data. At this time, the cluster 221 groups the tags whose correlation is a predetermined value or more for each tag based on the correlation information by analyzing the correlation between the tags of the data, and after grouping the tags having the similar pattern, maps the tag of the input data and the tag of the output data that corresponds to the input data.

Next, the sampler 223 derives the learning data by sampling the data clustered for each tag (operation S230). At this time, the sampler 223 generates the learning data of the neural network (NN) model based on the pattern analysis and the sampling algorithm. The operation S230 will be described in more detail with reference to FIG. 8 as follows.

Figure 8:
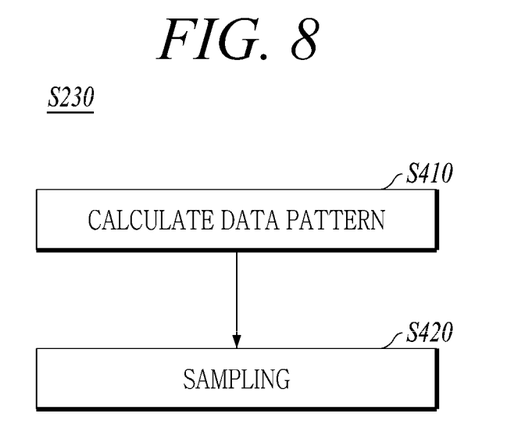
FIG. 8 is a flowchart of the operation to perform sampling of FIG. 6.

Referring to FIG. 8, the pattern analyzer 223a of the sampler 223 derives a data pattern by analyzing the data based on the L2 Norm (operation S410).

Thereafter, the data sampler 223b of the sampler 223 generates the learning data (LD) by sampling the data through the sampling algorithm based on the derived pattern (operation S420). This learning data (LD) is derived as the input value for learning the neural network (NN) model and the target value corresponding to the input value. The input value is a value input to the neural network (NN) during learning, and the target value is a value for comparing the input value with the output value of the neural network (NN) during learning.

Figure 9:
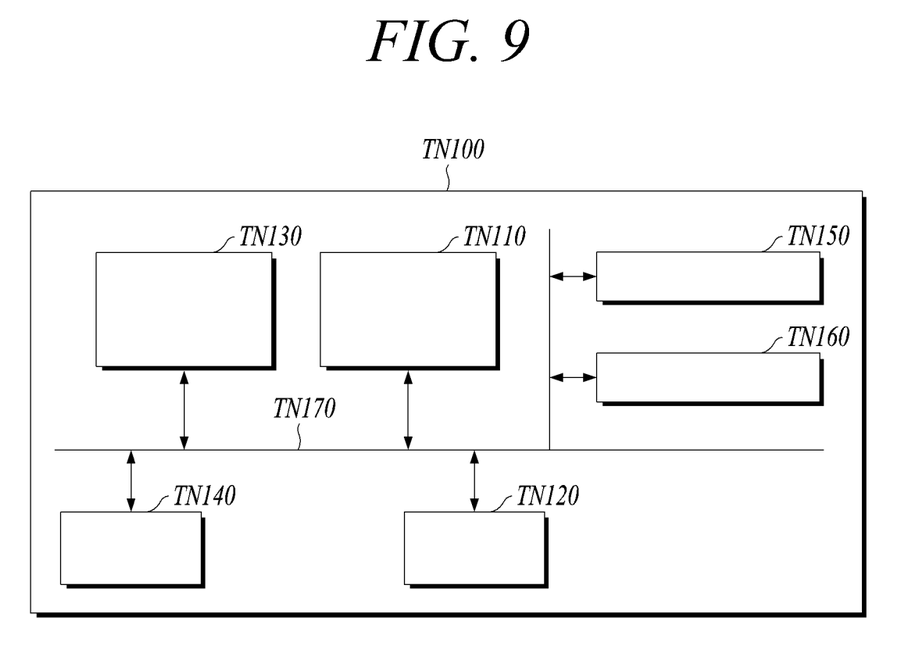
FIG. 9 is a diagram showing a computing apparatus according to an exemplary embodiment.

FIG. 9 shows a computing apparatus according to an exemplary embodiment. The computing apparatus (TN100) of FIG. 9 may be an apparatus described in the present specification and may include an apparatus for generating learning data, a combustion optimization apparatus, etc.

In FIG. 9, the computing apparatus (TN100) may include at least one processor (TN 110), a transceiver (TN 120), and a memory (TN 130) and may further include a storage apparatus (TN140), an input interface apparatus (TN150), an output interface apparatus (TN160), etc. The components included in the computing apparatus (TN100) may be connected by a bus (TN170) to perform communication between the components.

The processor (TN110) may execute a program command stored in at least one of the memory (TN130) and the storage apparatus (TN140). The processor (TN110) may include a central processing unit (CPU), a graphics processing unit (GPU), or a dedicated processor on which processing may be performed according to an exemplary embodiment. The processor (TN110) may be configured to implement the procedures, functions, methods, etc. described in connection with an exemplary embodiment. The processor (TN110) may control each component of the computing apparatus (TN100).

Each of the memory (TN130) and the storage apparatus (TN140) may store various information related to the operation of the processor (TN110). Each of the memory (TN130) and the storage apparatus (TN140) may be composed of at least one of a volatile storage medium and a nonvolatile storage medium. For example, the memory (TN130) may be composed of at least one of a read only memory (ROM) and a random access memory (RAM).

The transceiver (TN120) may transmit and receive a wired signal or a wireless signal. The transceiver (TN120) may be connected to a network to perform communication.

Meanwhile, various methods according to an exemplary embodiment described above may be implemented in the form of the readable program through various computer means to be recorded in a computer-readable recording medium. Here, the recording medium may include program commands, data files, data structures, etc. alone or in combination. The program command recorded on the recording medium may be those specially designed and configured for an exemplary embodiment or may also be known and available to those skilled in the art of computer software. For example, the recording medium may include a magnetic media such as a hard disk, a floppy disk, and a magnetic tape, an optical media such as a CD-ROM and a DVD, a magneto-optical media such as a floptical disk, and hardware apparatuses that are specially configured to store and execute the program command such as a ROM, a RAM, and a flash memory. Examples of the program command may include not only machine language wires such as those produced by a compiler, but also high-level language wires that may be executed by a computer by using an interpreter or the like. Such a hardware apparatus may be configured to operate as one or more software modules in order to perform the operation of an exemplary embodiment, and vice versa.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. An apparatus for generating learning data, comprising:
a data pre-processor configured to collect raw data comprising currently measured real-time data for boiler combustion and previously measured past data for the boiler combustion, and to perform pre-processing for the collected raw data, and
a data analyzer configured to derive learning data from the raw data by analyzing the raw data, wherein the data pre-processor comprises
a restorer configured to restore a portion with an abnormal signal in the raw data;
a filter configured to filter the raw data according to a predetermined condition through a base knowledge algorithm; and
an eraser configured to erase outliers in the raw data.

2. The apparatus for generating learning data of claim 1, wherein the data analyzer comprises
a cluster configured to cluster the raw data by deriving correlation between tags of the raw data necessary for learning by analyzing the correlation between the tags of the raw data; and
a sampler configured to extract the learning data from the raw data clustered according to the correlation between the tags.

3. The apparatus for generating learning data of claim 2, wherein the sampler comprises
a pattern analyzer configured to derive the pattern of the raw data by analyzing the raw data based on an L2 Norm; and
a data sampler configured to derive the learning data by sampling the raw data based on the derived pattern and a sampling algorithm.

4. The apparatus for generating learning data of claim 1, wherein the raw data comprises input data and output data corresponding to the input data.

5. The apparatus for generating learning data of claim 1, wherein the learning data comprises input data for learning a neural network (NN) model and target data corresponding to the input data.

6. An apparatus for generating learning data, comprising:
a management layer configured to collect currently measured real-time data for boiler combustion, to determine whether to perform combustion optimization by analyzing the collected real-time data, and to determine whether to tune a combustion model and a combustion controller;
a data layer configured to derive learning data from raw data comprising the real-time data and previously measured past data for the boiler combustion, wherein the learning data comprises input data for learning a neural network (NN) model, and target data corresponding to the input data;
a model layer configured to generate the combustion model and the combustion controller through the learning data; and
an optimal layer configured to calculate a target value for combustion optimization by using the combustion model and the combustion controller, and to output a control signal according to the calculated target value.

7. The apparatus for generating learning data of claim 6, wherein the data layer comprises
a data pre-processor configured to collect the raw data comprising the currently measured real-time data for boiler combustion and the previously measured past data for the boiler combustion, and to perform pre-processing for the collected raw data; and
a data analyzer configured to derive learning data from the raw data by analyzing the raw data.

8. The apparatus for generating learning data of claim 7, wherein the data pre-processor comprises
a restorer configured to restore a portion with an abnormal signal in the raw data;
a filter configured to filter the raw data according to a predetermined condition through a base knowledge algorithm; and
an eraser configured to erase outliers in the raw data.

9. The apparatus for generating learning data of claim 7, wherein the data analyzer comprises
a cluster configured to cluster the raw data by deriving correlation between tags of the raw data necessary for learning by analyzing the correlation between the tags of the raw data; and
a sampler configured to extract the learning data from the raw data clustered according to the correlation between the tags.

10. The apparatus for generating learning data of claim 9, wherein the sampler comprises
a pattern analyzer configured to derive the pattern of the raw data by analyzing the raw data based on an L2 Norm; and
a data sampler configured to derive the learning data by sampling the raw data based on the derived pattern and a sampling algorithm.

11. The apparatus for generating learning data of claim 6, wherein the raw data is accumulated over time, then classified and collected for each tag.

12. A method for generating learning data, comprising:
collecting, by a data pre-processor, raw data comprising currently measured real-time data for boiler combustion, and previously measured past data for the boiler combustion,
performing, by the data pre-processor, pre-processing for the collected raw data, and
deriving, by a data analyzer, learning data from the raw data by analyzing the raw data,
wherein the performing the pre-processing comprises
restoring, by a restorer of the data pre-processor, a portion with an abnormal signal in the raw data;
filtering, by a filter of the data pre-processor, the raw data according to a predetermined condition through a base knowledge algorithm; and
erasing, by an eraser of the data pre-processor, outliers in the raw data.

13. The method for generating learning data of claim 12, wherein the deriving the learning data comprises
clustering, by a cluster of the data analyzer, the raw data by deriving correlation between tags of the raw data necessary for learning by analyzing the correlation between the tags of the raw data; and
extracting, by a sampler of the data analyzer, the learning data from the raw data clustered according to the correlation between the tags.

14. The method for generating learning data of claim 13, wherein the extracting, by the sampler of the data analyzer, the learning data from the raw data clustered according to the correlation between the tags comprises deriving, by a pattern analyzer of the sampler, the pattern of the raw data by analyzing the raw data based on an L2 Norm; and extracting, by a data sampler of the sampler, the learning data by sampling the raw data based on the derived pattern and a sampling algorithm.

15. The method for generating learning data of claim 12, wherein the raw data comprises input data and output data corresponding to the input data.

16. The method for generating learning data of claim 12, wherein the raw data is accumulated over time, then classified and collected for each tag.

17. The method for generating learning data of claim 12, wherein the learning data comprises input data for learning a neural network (NN) model, and target data corresponding to the input data.

* * * * *